US010852189B2

(12) United States Patent
Liu et al.

(10) Patent No.: US 10,852,189 B2
(45) Date of Patent: Dec. 1, 2020

(54) FILTER ARRAY RECONSTRUCTIVE SPECTROMETRY

(71) Applicant: The Regents of the University of California, Oakland, CA (US)

(72) Inventors: Zhaowei Liu, San Diego, CA (US); Qian Ma, San Diego, CA (US); Eric Huang, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 178 days.

(21) Appl. No.: 16/079,654

(22) PCT Filed: Feb. 24, 2017

(86) PCT No.: PCT/US2017/019489
§ 371 (c)(1),
(2) Date: Aug. 24, 2018

(87) PCT Pub. No.: WO2017/147514
PCT Pub. Date: Aug. 31, 2017

(65) Prior Publication Data
US 2019/0056269 A1    Feb. 21, 2019

Related U.S. Application Data

(60) Provisional application No. 62/300,601, filed on Feb. 26, 2016.

(51) Int. Cl.
*G01J 3/28* (2006.01)
*G01J 3/36* (2006.01)
(Continued)

(52) U.S. Cl.
CPC ............... *G01J 3/36* (2013.01); *G01J 3/0208* (2013.01); *G01J 3/0218* (2013.01);
(Continued)

(58) Field of Classification Search
CPC .... G01J 3/02; G01J 3/28; G01J 3/2803; G01J 3/10; G01J 3/2823
(Continued)

(56) References Cited

U.S. PATENT DOCUMENTS 5,272,518 A * 12/1993 Vincent ..................... G01J 3/12
250/226
5,303,165 A    4/1994 Ganz et al.
(Continued)

FOREIGN PATENT DOCUMENTS

CN         101464535       6/2009
WO      WO-2008104928       9/2008

OTHER PUBLICATIONS

Abramovici, et al., LIGO: The laser interferometer gravitational-wave observatory, Science, 1992, pp. 325-333, vol. 256, No. 5055.
(Continued)

*Primary Examiner* — Md M Rahman
(74) *Attorney, Agent, or Firm* — Mintz Levin Cohn Ferris Glovsky and Popeo, P.C.

(57) ABSTRACT

A spectrometry system may include an etalon array having a first etalon and a second etalon. The first etalon may be configured to process light to at least generate a first transmission pattern. The first transmission pattern may have at least a first transmission peak corresponding to a first wavelength in an original spectrum of the light. The second etalon may be configured to process the light to at least generate a second transmission pattern. The second transmission pattern may have at least a second transmission peak corresponding to a second wavelength in the original spectrum of the light. The first etalon may have a different thickness than the second etalon in order for the first transmission pattern to have at least one transmission peak that is at a different wavelength than the second transmission pattern. The first transmission pattern and the second trans-
(Continued)

mission pattern may enable a reconstruction the original spectrum of the light.

20 Claims, 9 Drawing Sheets

(51) Int. Cl.
  *G01J 3/02* (2006.01)
  *G01J 3/26* (2006.01)
  *G01J 3/12* (2006.01)

(52) U.S. Cl.
  CPC .......... *G01J 3/0256* (2013.01); *G01J 3/0259* (2013.01); *G01J 3/0264* (2013.01); *G01J 3/0291* (2013.01); *G01J 3/26* (2013.01); *G01J 3/28* (2013.01); *G01J 3/2823* (2013.01); *G01J 2003/1234* (2013.01); *G01J 2003/1243* (2013.01)

(58) Field of Classification Search
  USPC ......................................................... 356/326
  See application file for complete search history.

(56) References Cited

U.S. PATENT DOCUMENTS

| | | | |
|---|---|---|---|
| 7,202,955 | B2 | 4/2007 | Te Kolste et al. |
| 2007/0077525 | A1 | 4/2007 | Davis |
| 2010/0182598 | A1 | 7/2010 | Choi et al. |
| 2012/0050869 | A1 | 3/2012 | Nishimura et al. |
| 2012/0212812 | A1* | 8/2012 | Weber ................ G03B 21/604 359/454 |
| 2014/0180087 | A1* | 6/2014 | Millett .................. A61B 5/743 600/437 |
| 2014/0226158 | A1* | 8/2014 | Trainer ................ G01J 3/0218 356/336 |
| 2015/0253189 | A1 | 9/2015 | Yetzbacher |
| 2018/0280723 | A1* | 10/2018 | Enwemeka .......... A61N 5/0616 |
| 2019/0374092 | A1* | 12/2019 | Wu ......................... A61B 1/07 |

OTHER PUBLICATIONS

August, et at., Compressive sensing spectrometry based on liquid crystal devices, Optics Letters, 2013, pp. 4496-4999, vol. 38, No. 23.
Bacon, et al., Miniature spectroscopic instrumentation: Applications to biology and chemistry. Rev. Scientific Instruments, 2004, 17 pages, vol. 75, No. 1.
Bao, et al., A Colloidal quantum dot spectrometer, Nature, 2015, pp. 67-82, vol. 523.
Baraniuk, Compressive Sensing, IEEE Signal Processing Magazine, 2007, pp. 118-124.
Candes, et al., An introduction to compressive sampling, IEEE Signal Processing Magazine, 2008, pp. 21-30.
Chaganti, et al., A simple miniature optical spectrometer with a planar waveguide grating coupler in combination with a plano-convex lens, Optics Express, 2006, 9 pages, vol. 14, No. 9.
Chang, et al., On the estimation of target spectrum for filter-array based spectrometers, Optics Express, 2008, pp. 1056-1061, vol. 16, No. 2.
Donoho, Compressed sensing, IEEE Trans. Inf. Theory, 2006, pp. 1289-1306, vol. 52.

Donoho, For most large Underdetermined Systems of Linear Equations the Minimal $\ell$-norm Solution Is Also the Sparsest Solution, Communications on Pure and Applied Mathematics, 2006, pp. 0797-0829.
Dryzek, et al., Quantum size effect in optical spectra of thin metallic films, Physical Review Letters, 1987, pp. 721-724, vol. 58, No. 7.
Foster, et al., Broad-band optical parametric gain on a silicon photonic chip, Nature, 2006, pp. 960-963, vol. 441.
Gan, et al., A high-resolution spectrometer based on a compact planar two dimensional photonic crystal cavity array, Applied Physics Letters, 2012, 4 pages, vol. 100.
Hache, et al., The optical Kerr Effect in small metal particles and metal colloids: The case of gold, Applied Physics A, 1988, pp. 347-357, vol. 47.
Hercher, Tunable single mode operation of gas lasers using intracavity tilted etalons, Applied Optics, pp. 1103-1106, vol. 8, No. 6.
Jacquinot, The luminosity of spectrometers with prisms, gratings or Fabry-Perot etalons, J. of the Optical Society of America, 1954, pp. 761-765, vol. 44, No. 10.
Koh, et al., An interior-point method for large-scale $\ell$ 1-regularized logistics regression, J. of Machine Learning Research, 2007, pp. 1519-1555, vol. 8.
Kong, et al., Infrared micro-spectrometer based on a diffraction grating, Sensors and Actuators, 2001, pp. 88-95, vol. 92.
Kurokawa, et al., Filter-Based Miniature Spectrometers: Spectrum Reconstruction Using Adaptive Regularization, 2011, pp. 1556-1563, vol. 11, No. 7.
Lapray, et al., Multispectral Filter Arrays: Recent Advances and Practical Implementation, Sensors, 2014, pp. 21626-21659, vol. 14.
Mollenauer, et al., Experimental observation of picosecond pulse narrowing and solitons in optical fibers, Physical Review Letters, 1980, pp. 1095-1098, vol. 45, No. 13.
Oliver, et al., Improving resolution of miniature spectrometers by exploiting sparse nature of signals, Optics Express, 2012, 13 pages, vol. 20, No. 3.
Redding, et al., Using a multimode fiber as a high-resolution, low-loss spectrometer, Optics Letters, 2012, pp. 3384-3386, vol. 37, No. 16.
Romanini, et al., Optical-feedback cavity-enhanced absorption: a compact spectrometer for real-time measurement of atmospheric methane, Appl. Phys. B, 2006, pp. 659-667, vol. 83.
Sandar, et al., Selffocusing phase transmission grating for an integrated optical microspectrometer, Sensors and Actuators, 2001, pp. 1-9, vol. 88.
Shafer, Lens designs with extreme image quality features, Adv. Opt. Techn., 2013, pp. 53-62, vol. 2, No. 1).
Sirtori, et al., Giant, triply resonant, third-order nonlinear susceptibility in chi 3 omega (3) coupled quantum wells, Phys. Rev. Lett., 1992, pp. 1010-1013, vol. 68, No. 7.
Schmitt-Rink, et al., Linear and non-linear optical properties of semiconductor quantum wells, Advances in Physics, 1989, pp. 89-188, vol. 38, No. 2.
Wang, et al., Concept of a high-resolution miniature spectrometer using an integrated filter array, Optics Letters, 2007, pp. 632-634, vol. 32, No. 6.
Wolffenbuttel, State-of-the-Art in Integrated Optical Microspectrometers, IEEE Transactions on instrumentation and measurement, 2004, pp. 197-202, vol. 53, No. 1.
Yang, et al., Miniature spectrometer based on diffraction in a dispersive hole array, Optics Letters, 2015, pp. 3217-3220, vol. 40, No. 13.
Yetzbacher, et al., Multiple-order staircase etalon spectroscopy, Proc. of SPIE, 11 pages, vol. 9101.

* cited by examiner

US 10,852,189 B2

FILTER ARRAY RECONSTRUCTIVE SPECTROMETRY

RELATED APPLICATION

This application is a national-phase entry of Patent Cooperation Treaty Application No. PCT/US2017/019489 filed Feb. 24, 2017, entitled "FILTER ARRAY RECONSTRUCTIVE SPECTROMETRY," which claims the benefit of priority to U.S. Provisional Patent Application No. 62/300,601 file on Feb. 26, 2016 and entitled "ETALON ARRAY RECONSTRUCTIVE SPECTROMETRY," the disclosure of which is incorporated herein by reference in its entirety.

TECHNICAL FIELD

The subject matter disclosed herein relates generally to spectrometry and more specifically to reconstructive spectrometry.

BACKGROUND

A spectrometer may be used to measure the properties of light over one or more portions of the electromagnetic frequency spectrum including, for example, ionizing radiation (e.g., gamma radiation, hard x-rays, soft x-rays), optical waves (e.g., near ultraviolet, near infrared, mid infrared, far infrared), and/or microwaves and radio waves. Conventional grating-based spectrometers typically rely on dispersive optics (e.g., a prism and/or a grating) to separate incoming light into a spectrum of the light's component wavelengths. The diffracted light may subsequently be propagated (e.g., by one or more reflective mirrors) onto a sensor (e.g., photodiodes and/or photo transistors) configured to measure the optical power or intensity (e.g., energy per unit of area) of each of the component wavelengths.

SUMMARY

Systems and methods are provided for filter array spectrometry. The system may include an etalon array having a first etalon and a second etalon. The first etalon may be configured to process light to at least generate a first transmission pattern. The first transmission pattern may have at least a first transmission peak corresponding to a first wavelength in an original spectrum of the light. The second etalon may be configured to process the light to at least generate a second transmission pattern. The second transmission pattern may have at least a second transmission peak corresponding to a second wavelength in the original spectrum of the light. The first etalon may have a different thickness than the second etalon in order for the first transmission pattern to have at least one transmission peak that is at a different wavelength than the second transmission pattern. The first transmission pattern and the second transmission pattern may enable a reconstruction the original spectrum of the light.

In some variations, one or more features disclosed herein including the following features can optionally be included in any feasible combination. The system may further include at least one data processor and at least one memory. The at least one memory may include program code that provides operations when executed by the at least one data processor. The operations may include reconstructing, based at least on the first transmission pattern and the second transmission pattern, the original spectrum of the light. The reconstructing of the original spectrum of the light may include applying one or more signal reconstruction techniques. The one or more signal reconstruction techniques may include compressive sensing. The one or more signal reconstruction techniques may be applied to determine an approximate spectrum of the light that best fits the first transmission pattern and the second transmission pattern.

In some variations, a correction factor may be determined. The correction factor may be determined based at least on a difference between the original spectrum of the light passing through the etalon array and the reconstructed spectrum of the light. The correction factor may be applied to a light spectrum that is subsequently reconstructed based on transmission patterns generated by the first etalon and/or the second etalon.

In some variations, an object emitting, reflecting, and/or transmitting the light may be analyzed based at least on the reconstructed spectrum of the light. The analyzing of the object may include determining, based at least on the reconstructed spectrum of the light, a molecular composition of the object. The analyzing of the object may include determining, based at least on the reconstructed spectrum of the light, a temperature of the object. The analyzing of the object may include comparing the reconstructed spectrum of the light to a plurality of known spectra.

In some variations, the first etalon may be formed from a first pair of reflective surfaces separated by a first distance and the second etalon may be formed from a second pair of reflective surfaces separated by a second distance. The first pair of reflective surfaces and/or the second pair of reflective surfaces may be formed from a metallic film. The metallic film may be silver (Ag), gold (Au), and/or aluminum (Al). The first pair of reflective surfaces and/or the second pair of reflective surfaces may be separated by an optically transparent medium. The optically transparent medium may be silicon dioxide ($SiO_2$). The first transmission peak may be caused at least by constructive interference of the light being reflected by the first pair of reflective surfaces, and the second transmission peak may be caused at least by constructive interference of the light being reflected by the second pair of reflective surfaces.

In some variations, the etalon array may include a threshold number of etalons, the threshold number of etalons being determined based at least on a sparsity of the spectrum of the light. The filter array spectrometry system may further include a sensor. The etalon array may be disposed before the sensor and the sensor may be configured to at least capture the first transmission pattern and/or the second transmission pattern. The sensor may be an image sensor and/or a light intensity detector. The sensor may be a charge-coupled device (CCD) sensor, a complementary metal-oxide semiconductor (CMOS) sensor, a thermal sensor, a photodiode, an avalanche photo detector (APD), and/or a photomultiplier tube (PMT). The filter array spectrometry system may further include one or more optics configured to control an incident angle and/or focus the light with respect to etalon array. The filter array spectrometry system may further include a housing configured to encase the etalon array, the sensor, and the one or more optics. The etalon array may form a grid structure configured to simultaneously dispose the first etalon and the second etalon before the sensor, and the sensor is configured may be simultaneously capture the first transmission pattern and the second transmission pattern. The etalon array may be a selectable wheel configured to dispose the first etalon before the sensor prior to disposing the second etalon before the sensor, and the sensor is configured to capture the first transmission pattern prior to capturing the second transmission pattern. The resolution of the reconstructed spectrum may correspond to a respective thickness of the first etalon and the second etalon.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The accompanying drawings, which are incorporated in and constitute a part of this specification, show certain aspects of the subject matter disclosed herein and, together with the description, help explain some of the principles associated with the subject matter disclosed herein. In the drawings.

When practical, similar reference numbers denote similar structures, features, or elements.

DETAILED DESCRIPTION

Figure 1A:
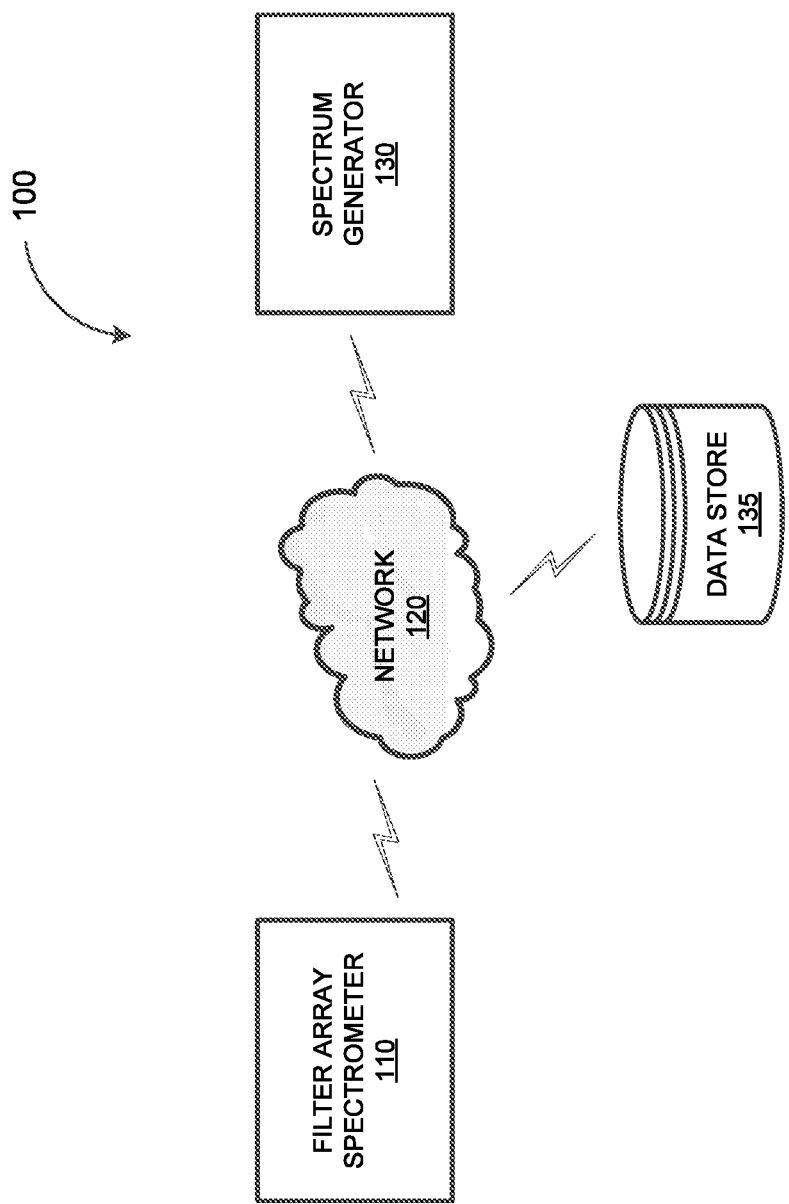
FIG. 1A depicts a block diagram illustrating a reconstructive spectrometry system, in accordance with some example embodiments.

Conventional spectrometers may measure the properties of light (e.g., intensity) by at least diffracting incoming light (e.g., into a spectrum of the light's component wavelengths) and propagating the diffracted light onto a sensor (e.g., an array of photodiodes and/or photo transistors). However, performing these operations typically requires a large number of moving optical components (e.g., prisms, gratings, and/or reflective mirrors), which renders conventional spectrometers excessively bulky, fragile, and expensive. Thus, despite its many useful applications, spectrometry has thus far failed to proliferate beyond the laboratory.

In some example embodiments, a filter array spectrometer may include a filter array with a plurality of filters acting as optical resonators. Each filter in the filter array may be an etalon that is configured with a specific passband. Thus, as light passes through the filters in the filter array, each filter may attenuate at least one wavelength (or portion of the spectrum) that is outside of the passband of the filter while allowing the transmission of at least one other wavelength (or portion of the spectrum) that is in the passband of the filter. The output of each filter in the filter array may be an output spectrum that forms a transmission pattern. This transmission pattern may include multiple transmission peaks corresponding to the wavelengths (or portions of the spectrum) that is able to pass through the filter. According to some example embodiments, the filter array may include filters that are different in thickness because different thickness filters may generate different transmission patterns that are unique to each filter. The resulting plurality of unique transmission patterns (e.g., generated by different filters in the filter array) may be used to reconstruct the full spectrum of the light passing through the filter array.

In some example embodiments, a plurality of transmission patterns from different thickness filters (e.g., etalons) in a filter array may be used to reconstruct the original spectrum of light passing through the filter array. Each transmission pattern may include a sampling of the wavelengths in the original spectrum of light. Thus, the original spectrum of the light may be recovered by at least applying one or more signal reconstruction techniques (e.g., compressed sensing and/or the like) to at least determine an approximation of the original spectrum that best fits the transmission patterns generated by all the filters in the filter array. It should be appreciated that a filter array configured in accordance to various embodiments of the present disclosure may be both compact and inexpensive. Moreover, a filter array spectrometer formed from such a filter array may contain no moving parts and may therefore be more robust than conventional spectrometers (e.g., grating-based spectrometers). Thus, in some example embodiments, a filter array spectrometer may be deployed for a gamut of applications including, for example, lab-on-chip measurements, field spectrometry, space instrumentation, and embedded systems.

In some example embodiments, the spectrum of the light that is emitted, reflected, and/or transmitted by an object may be used to analyze the object. For instance, an object may emit, reflect, and/or transmit light (e.g., in the mid-infrared range) that may be specific to the molecules present in the object. Thus, the spectrum of light emitted, reflected and/or transmitted by the object may serve as a spectral signature that may be used to determine the molecular composition of the material and/or compound forming the object. Alternately and/or additionally, the object may emit, reflect, and/or transmit thermal electromagnetic radiation (e.g., black-body radiation in the mid-infrared range) that may be used for passive thermal vision and/or temperature measurements. For clarity and conciseness, various embodiments of the present disclosure are described with respect to light waves. However, the subject matter disclosed herein may also be applied to other wave-like phenome including, for example, acoustic waves, seismic waves, gravity waves, and/or mechanical waves. Furthermore, it should be appreciated that a light source may be used to actively illuminate the object, when there is insufficient light in the surrounding environment to cause light to be emitted, reflected, and/or transmitted from the object. However, the filter array spectrometer may also be able to capture light that is passively emitted, reflected, and/or transmitted by an object without an active external light source.

In some example embodiments, a filter array spectrometer may have a compact form factor that enables the filter array spectrometer to be integrated into a portable device including, for example, a smartphone, a tablet personal computer (PC), a laptop, a robot, a drone, a wearable device, and/or the like. For example, the filter array spectrometer may be integrated into a smartphone camera by at least including, in the camera, the filter array while the smartphone's processor may be utilized for spectrum reconstruction. Thus, according to some example embodiments, the form factor of the filter array spectrometer may render the field array spectrometer especially suitable for field spectrometry. For instance, the filter array spectrometer may be used to determine, based on light emitted, reflected, and/or transmitted from various objects, the molecular composition of these objects. As one illustrative example, a smartphone camera with an integrated filter array may be used to capture the light emitted, reflected, and/or transmitted by a food item in order to determine the fat and/or sugar content of the food item.

FIG. 1A depicts a block diagram illustrating a reconstructive spectrometry system 100, in accordance with some example embodiments. Referring to FIG. 1A, the reconstructive spectrometry system 100 may include a filter array spectrometer 110 and a spectrum generator 130. As shown in FIG. 1A, the filter array spectrometer 110 and the spectrum generator 130 may be communicatively coupled via a wired and/or wireless network 120, which may be a local area network (LAN), a wide area network (WAN), and/or the Internet. Here, the filter array spectrometer 110 may operate remotely from the spectrum generator 130, for example, as a detached and/or detachable spectrometer. Alternately and/or additionally, the filter array spectrometer 110 and/or the spectrum generator 130 may be integrated components of a host platform such as, for example, a smartphone, a tablet personal computer (PC), laptop, a robot, a drone, and/or a wearable device (e.g., smartwatch, fitness tracker, and/or the like). For instance, the filter array spectrometer 110 and the spectrum generator 130 may both be integrated into the host platform such that the host platform may serve as a standalone spectrometer.

In some example embodiments, the filter array spectrometer 110 may be configured to generate a plurality of transmission patterns associated with light passing through the filter array spectrometer 110. For instance, the filter array spectrometer 110 may include a plurality of filters that forms, for example, a filter array. The plurality of filters may be etalons of varying thickness. It should be appreciated that an etalon may include a pair of partially reflective surfaces and the thickness of the etalon may correspond to a distance between the pair of partially reflective surfaces.

In some example embodiments, an etalon may be configured to transmit only some wavelengths of the light (e.g., from the original spectrum of light) passing through the etalon, thereby forming a transmission pattern. This transmission pattern may include multiple transmission peaks that correspond to the wavelengths of light (e.g., from the original spectrum of light) that are able to pass through the etalon. Moreover, this transmission pattern may correspond to the thickness of the etalon as well as the reflectivity of the reflective surfaces forming the etalon. Thus, the same light passing through etalons having different thicknesses may generate different transmission patterns that are unique to each etalon.

In some example embodiments, the filter array spectrometer 110 may further include a sensor configured to capture the transmission pattern from each filter in the filter array. The sensor may be an image sensor and/or a light intensity detector. For instance, the sensor 146 may be a charge-coupled device (CCD) sensor, a complementary metal-oxide semiconductor (CMOS) sensor, a thermal sensor, a photodiode, an avalanche photo detector (APD), a photomultiplier tube (PMT), and/or the like.

In some example embodiments, the spectrum generator 130 may be configured to reconstruct the original spectrum of the light passing through the filter array spectrometer 110. Each filter (e.g., etalon) in the filter array forming the filter array spectrometer 110 may provide a transmission pattern (e.g., captured by the sensor) that is unique to that filter. For instance, the same light may pass through filters (e.g., etalons) having different thicknesses, thereby generating different transmission patterns at each filter. Each transmission pattern may include transmission peaks that correspond to wavelengths that are part of the original spectrum of the light. These different transmissions patterns may be used to reconstruct the original spectrum of light passing through the filter array spectrometer 110.

In some example embodiments, the reconstructed spectrum of the light passing through the filter array spectrometer 110 may be used to analyze an object emitting, reflecting, and/or transmitting the light. As noted earlier, the object may emit, reflect, and/or transmit light with and/or without an active external light source. According to some example embodiments, the object may emit, reflect, and/or transmit light (e.g., in the mid-infrared range) that may be specific to the molecules present in the object. Here, the spectrum of light emitted, reflected, and/or transmitted by the object may serve as a spectral signature that may be used to determine the molecular composition of the object (e.g., the sugar, fact, and/or protein content of a food item). Thus, the molecular composition of the object may be determined by at least identifying, in a data store 135 storing a plurality of spectral signatures of known molecular compositions, a spectral signature that is a match to the reconstructed spectrum. Alternately and/or additionally, the object may emit, reflect, and/or transmit thermal electromagnetic radiation (e.g., black-body radiation in the mid-infrared range) that may be used for passive thermal vision and/or temperature measurements.

Figure 1B:
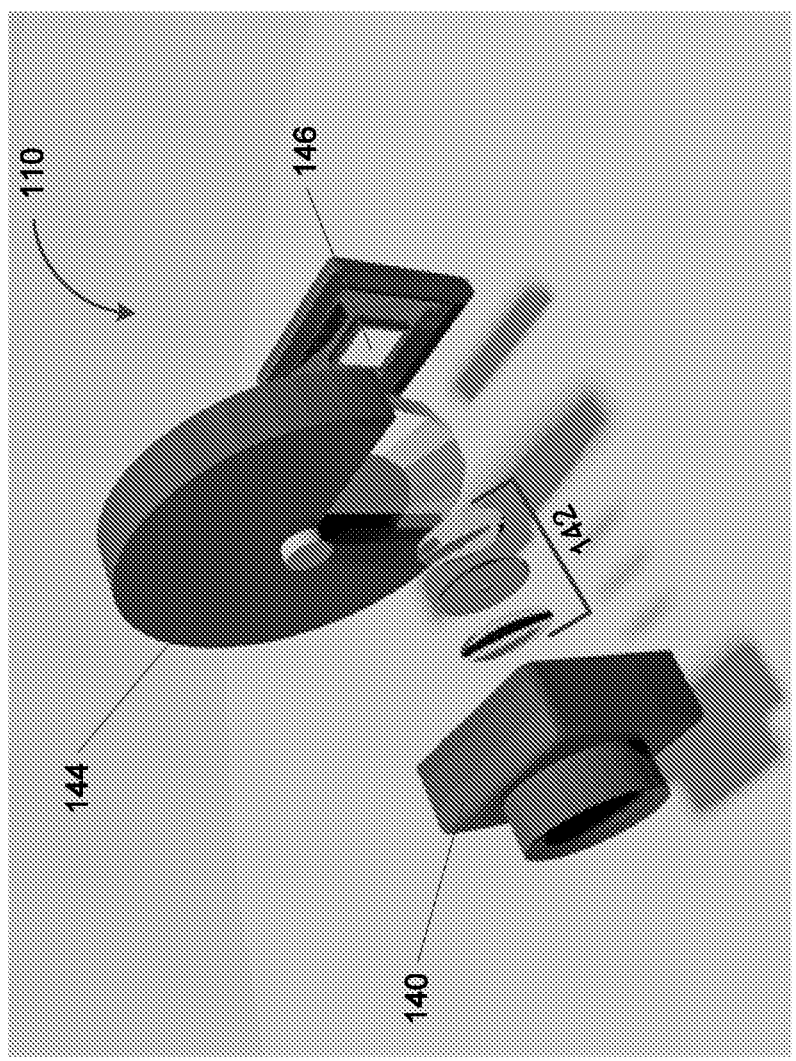
FIG. 1B depicts an example configuration of a filter array spectrometer, in accordance with some example embodiments.

FIG. 1B depicts an example configuration of the filter array spectrometer 110, in accordance with some example embodiments. Referring to FIGS. 1A-B, the filter array spectrometer 110 may include a selectable filter wheel 144 and a sensor 146. As shown in FIG. 1B, the filter array spectrometer 110 may be configured with a single sensor (e.g., the sensor 146) that is capable of capturing the transmission pattern from one filter at a time. Thus, in accordance with some example embodiments, the selectable filter wheel 144 may be configured to couple a single filter, such as an etalon, with the sensor 146 at a time. For instance, the selectable filter wheel 144 may be rotated to place a single filter (e.g., etalon) before the sensor 146, thereby enabling the sensor 146 to capture the transmission pattern from that one filter before the selectable filter wheel 144 may be rotated to place another filter (e.g., etalon) before the sensor 146. It should be appreciated that the sensor 146 may be any image sensor and/or light intensity detector. For instance, the sensor 146 may be a charge-coupled device (CCD) sensor, a complementary metal-oxide semiconductor (CMOS) sensor, a thermal sensor, a photodiode, an avalanche photo detector (APD), a photomultiplier tube (PMT), and/or the like.

Referring again to FIG. 1B, the filter array spectrometer 110 may further include one or more optics 142. The one or more optics 142 may be, for example, optical lenses and/or mirrors configured to control the incident angle and/or focus of the incoming light with respect to the filters in the selectable filter wheel 144. Furthermore, as shown in FIG. 1B, the filter array spectrometer 110 may include a housing 140. The one or more optics 142, the selectable filter wheel 144, and/or the sensor 146 may be encased within the housing 140. According to some example embodiments, the housing 140 may be configured to enable the filter array spectrometer 110 to serve as a detached and/or detachable spectrometer. Alternately and/or additionally, the housing 140 may be configured to enable the filter array spectrometer 110 to be an integrated component of a host platform (e.g., a smartphone, a tablet personal computer, laptop, a robot, a drone, a wearable device, and/or the like).

Figure 1C:
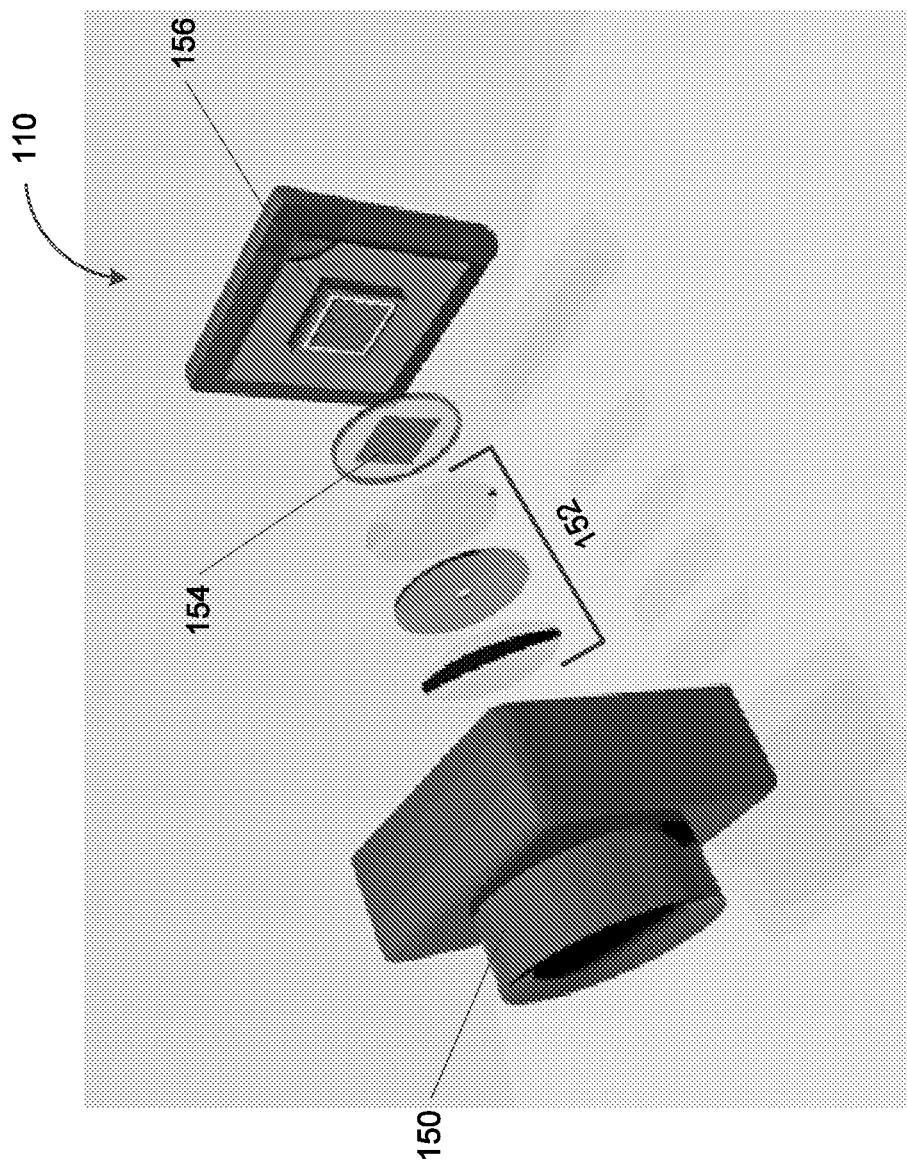
FIG. 1C depicts an example configuration of a filter array spectrometer, in accordance with some example embodiments.

FIG. 1C depicts another example configuration of the filter array spectrometer 110, in accordance with some example embodiments. Referring to FIGS. 1A and C, the filter array spectrometer 110 may include a filter array 154 and a sensor array 156. The filter array 154 may be, for example, an array of etalons having varying thicknesses. As shown in FIG. 1B, the filter array spectrometer 110 may be configured with an array of sensors, such as the sensor array 156, that is capable of capturing the transmission pattern from multiple filters (e.g., etalons) at once. Thus, in accordance with some example embodiments, the filter array 154 may be placed before the sensor array 156 to enable the sensor array 156 to capture transmission patterns from a plurality of filters in the filter array 154. It should be appreciated that the sensor array 156 may be formed from a plurality of image sensors and/or light intensity detector. For example, the sensor array 156 may include a plurality of charge-coupled device (CCD) sensors, complementary metal-oxide semiconductor (CMOS) sensors, thermal sensors, photodiodes, avalanche photo detectors (APD), photomultiplier tubes (PMT), and/or the like.

Referring again to FIG. 1C, the filter array spectrometer 110 may further include one or more optics 152. The one or more optics 152 may be, for example, optical lenses and/or mirrors configured to control the incident angle and/or focus of the incoming light with respect to the filter array 154. Furthermore, as shown in FIG. 1B, the filter array spectrometer 110 may include a housing 150. The one or more optics 152, the filter array 154, and/or the sensor array 156 may be encased within the housing 150. According to some example embodiments, the housing 150 may be configured to enable the filter array spectrometer 110 to serve as a detached and/or detachable spectrometer. Alternately and/or additionally, the housing 150 may be configured to enable the filter array spectrometer 110 to be an integrated component of a host platform (e.g., a smartphone, a tablet personal computer, laptop, a robot, a drone, a wearable device, and/or the like).

Figure 1D:
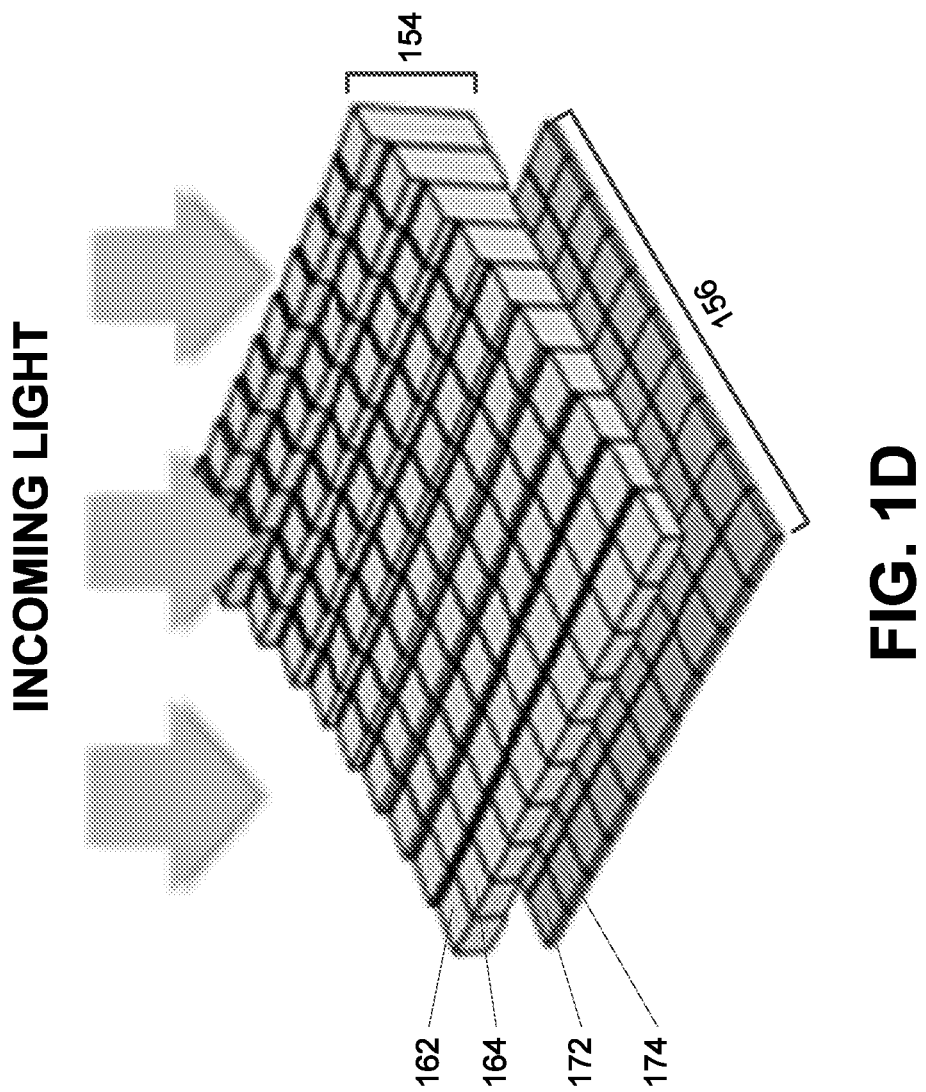
FIG. 1D depicts a perspective view illustrating a filter array and a sensor array, in accordance with some example embodiments.

FIG. 1D depicts a perspective view of the filter array 154 and the sensor array 156, in accordance with some example embodiments. The filter array 154 may be an array of etalons having varying thicknesses. Referring to FIGS. 1A and 1C-D, the filter array 154 may be a 10×10 grid structure having 100 separate filters such as etalons. However, it should be appreciated that the filter array 154 may include any number of separate filters. Moreover, the filters forming the filter array 154 arranged in any pattern in addition to and/or instead of the grid structure shown in FIG. 1D.

In some example embodiments, the filter array 154 may be positioned before the sensor array 156 such that transmission patterns formed by incoming light passing through the filter array 154 may be captured by the sensor array 156. For instance, as shown in FIG. 1D, the filter array 154 may include a plurality of filters including, for example, a first filter 162 and a second filter 164. The first filter 162 and the second filter 164 may be etalons having different thicknesses and thus different optical properties. Meanwhile, the sensor array 156 may include a plurality of sensors including, for example, a first sensor 172 and a second sensor 174. The first sensor 172 and the second sensor 174 may be charge-coupled device (CCD) sensors and/or complementary metal-oxide semiconductor (CMOS) sensors.

In some example embodiments, the first sensor 172 may be configured to capture the transmission pattern formed by the incoming light passing through the first filter 162 while the second sensor 174 may be configured to capture the transmission pattern of the incoming light passing through the second filter 164. It should be appreciated that the first filter 162 may have a different thickness than the second filter 165. This variation in the thickness may cause the incoming light passing through the first filter 162 to form a different transmission pattern than the incoming light passing through the second filter 164. The different transmission patterns maybe used (e.g., by the spectrum generator 130) to reconstruct the original spectrum of the incoming light.

Figure 1F:
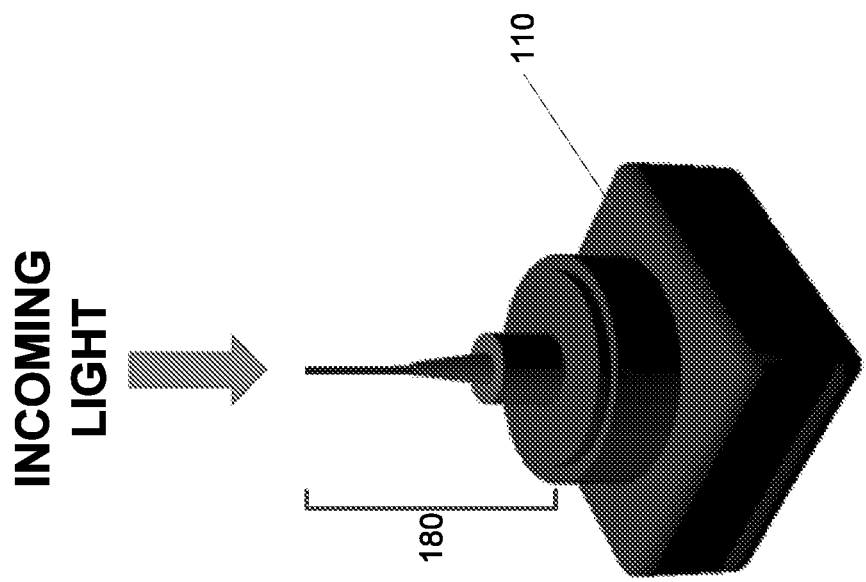
FIG. 1F depicts an input option for a filter array spectrometer, in accordance with some example embodiments.
Figure 1E:
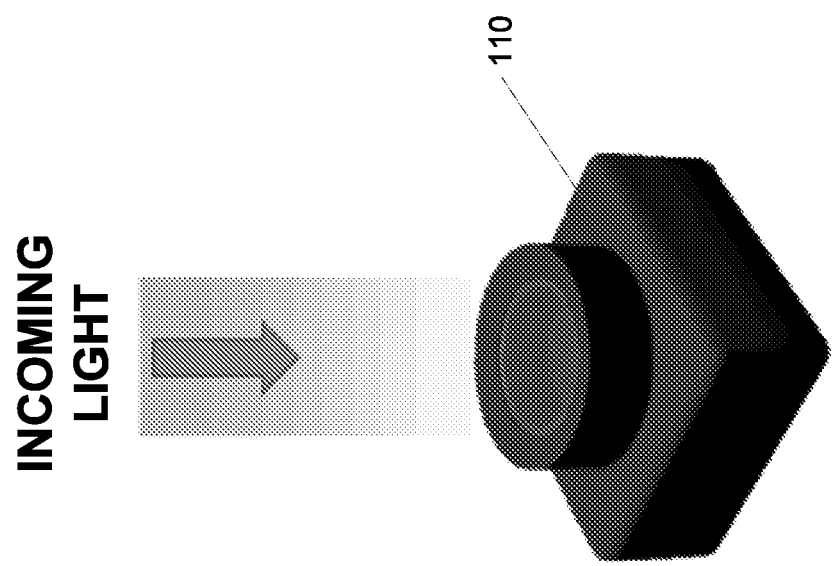
FIG. 1E depicts an input option for a filter array spectrometer, in accordance with some example embodiments.

FIGS. 1E-F depict input options for the filter array spectrometer 110, in accordance with some example embodiments. As shown in FIG. 1E, in some example embodiments, the filter array spectrometer 110 may be configured to directly capture incoming light. Alternately and/or additionally, the filter array spectrometer 110 may be configured to capture incoming light via a fiber optics port 180. It should be appreciated that the filter array spectrometer 110 may be configured to capture incoming light in any manner.

Figure 2A:
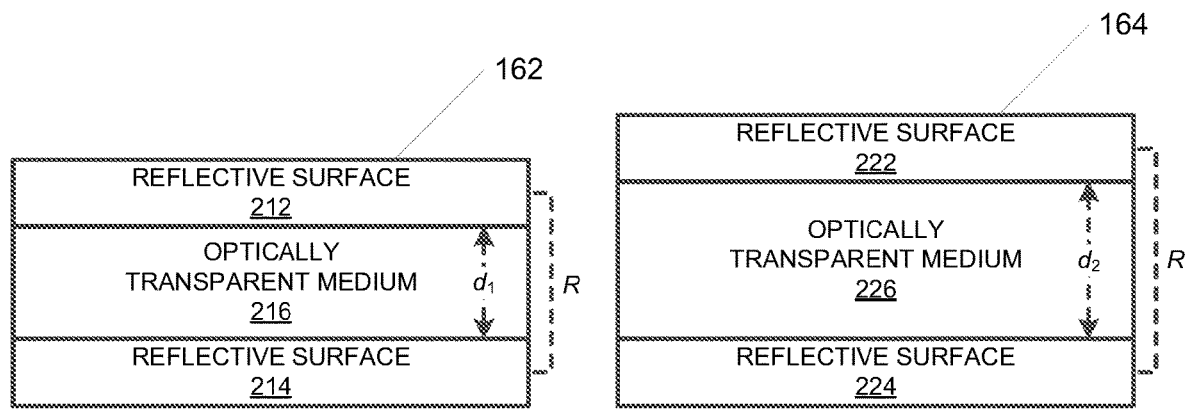
FIG. 2A depicts a first filter and a second filter, in accordance with some example embodiments.

FIG. 2A depicts the first filter 162 and the second filter 164, in accordance with some example embodiments. Referring to FIGS. 1A-C and 2A, the first filter 210 and the second filter 220 may form at least a portion of the selectable filter wheel 144 described with respect to FIG. 1B and/or the filter array 154 described with respect to FIG. 1C.

As shown in FIG. 2A, the first filter 162 and the second filter 164 may be etalons formed from a pair of reflective surfaces separated by an optically transparent medium. For instance, the first filter 162 may include a first reflective surface 212 and a second reflective surface 214 that are separated by a first optically transparent medium 216. Meanwhile, the second filter 164 may include a third reflective surface 222 and a fourth reflective surface 224 that are separated by a second optically transparent medium 226. In some example embodiments, the reflective surfaces forming the first filter 162 and/or the second filter 164 may be partially reflective. Thus, the first reflective surface 212, the second reflective surface 214, the third reflective surface 216, and/or the fourth reflective surface 218 may be associated with a reflectivity R. It should be appreciated that the reflectivity R of a reflective surface may correspond to a portion of the incoming light that may be reflected by the reflective surface and/or a portion of the incoming light that may be allowed to pass through the reflective surface.

According to some example embodiments, the first reflective surface 212, the second reflective surface 214, the third reflective surface 216, and/or the fourth reflective surface 218 may be formed from a metallic film including, for example, silver (Ag), gold (Au), aluminum (Al), and/or the like. The metallic film may have a thickness of 30 nanometers (nm) and/or optimized different thickness. The first optically transparent medium 216 and/or the second optically transparent medium 218 may be formed from a 700 nanometer thick layer of silicon dioxide ($SiO_2$).

In some example implementations, the first filter 162 and/or the second filter 164 may be a part of a 10×10 filter array. However, it should be appreciated that the first filter 162 and/or the second filter 164 may be part of any N×M filter array, where N and M may be a same or different arbitrary numbers. To form this 10×10 filter array, a 30 nanometer layer of silver (Ag) may first be deposited on a glass substrate using sputtering deposition while a 700 nanometer layer of silicon dioxide ($SiO_2$) may be subsequently deposited thereon using plasma-enhanced chemical vapor deposition. A 10×10 grid step structure may be formed from poly(methyl methacrylate) (PMMA) by at least spin-coating a 2.8 micron thick layer of poly(methyl methacrylate) on top of the silicon dioxide and then depositing a 2.5 micron thick layer of conductive gold (Au) thereon. The resulting structure (e.g., a 10×10 grid of squares having dimensions of 500×500 microns) may be placed in an electron beam lithography machine and exposed to a varying electron beam dose, which may range from 1.4 to 80 micro-Colombes per square centimeter ($\mu C/cm^2$) at an energy of 10 kiloelectronvolt (keV). The gold (Au) may be subsequently removed using a potassium iodide (KI) etchant while the poly(methyl methacrylate) may be developed by submerging the poly(methyl methacrylate) grid structure in a solution of methyl isobutyl ketone (MIBK) for 5 minutes and rinsing with isopropyl alcohol for 30 seconds. This may result in a 10 by 10 array of recesses (e.g., within the poly(methyl methacrylate)) that range in depth from 20 nanometers to 2 microns. Here, the poly(methyl methacrylate) grid structure may be dried under nitrogen gas ($N_2$) and finished with an additional 30 nanometer layer of silver (e.g., applied via sputter deposition) and a 30 nanometer layer of silicon dioxide serving as a protective film to prevent oxidation of the silver. The resulting 10×10 filter array may include filters (e.g., the first filter 162 and/or the second filter 164) that range in thickness between 1.5 microns to 3.5 microns.

Figure 3A:
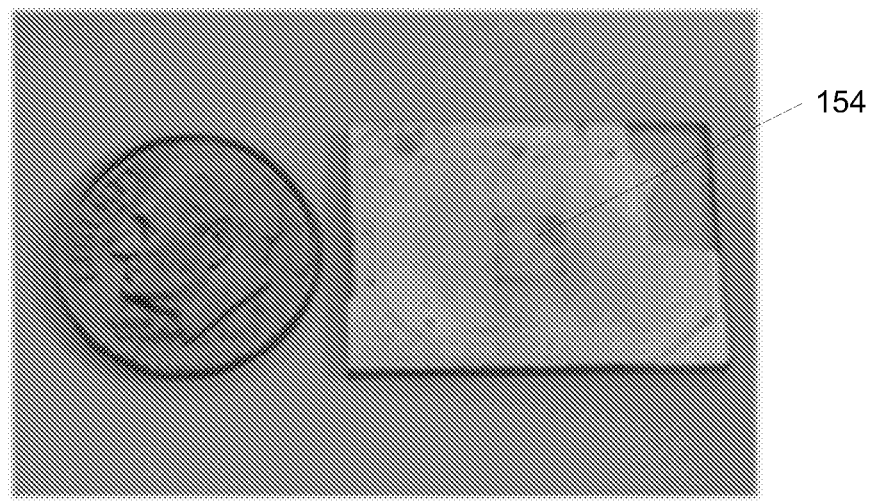
FIG. 3A depicts a filter array, in accordance with some example embodiments.
Figure 3B:
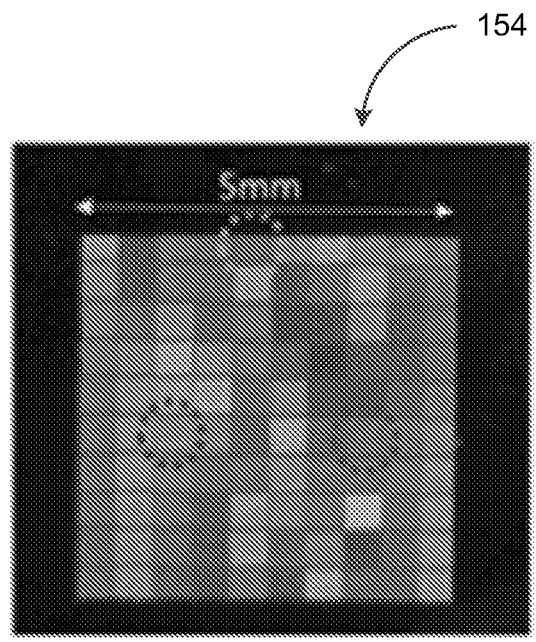
FIG. 3B depicts a filter array, in accordance with some example embodiments.

FIGS. 3A-B depicts the filter array 154, in accordance with some example embodiments. Referring to FIGS. 3A-B, the filter array 154 may be a 5 millimeter by 5 millimeter structure with 100 filters that form a 10×10 grid. For scale, FIG. 3A depicts the filter array 154 next to a dime. Meanwhile, FIG. 3B shows the filter array 154 being back-illuminated by room fluorescent lighting. As shown in FIG. 3B, owing to differences in filter thickness and the resulting transmission pattern, color transmission may vary from filter to filter.

In some example embodiments, the first filter 162 may have a different thickness than the second filter 164. The respective thicknesses of the first filter 162 and the second filter 164 may correspond to a distance separating the reflective surfaces forming the first filter 162 and the second filter 164. As shown in FIG. 2A, the first reflective surface 212 and the second reflective surface 214 (e.g., forming the first filter 162) may be separated by a first distance $d_1$. Meanwhile, the third reflective surface 222 and the fourth reflective surface 224 (e.g., forming the second filter 164) may be separated by a second distance $d_2$. Incoming light passing through a filter (e.g., etalon) may form a transmission pattern as the reflective surfaces may cause the incoming light to interfere with itself by at least reflecting some portions of the light while transmitting other portions of the light. In particular, the transmission pattern may include periodic transmission peaks resulting from constructive interference between portions of the light being reflected by the reflective surfaces.

Figure 2B:
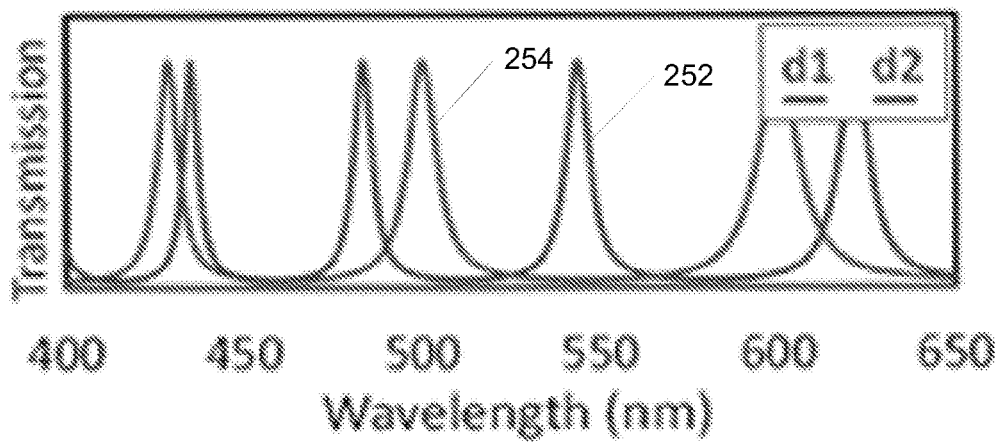
FIG. 2B depicts a graph illustrating transmission patterns associated with a first filter and a second filter, in accordance with some example embodiments.

FIG. 2B depicts a graph illustrating transmission patterns associated with the first filter 162 and the second filter 164, in accordance with some example embodiments. Referring to FIGS. 1A-C and 2A-B, the transmission patterns associated with the first filter 162 and the second filter 164 may be captured by filter array 156 (e.g., the first sensor 172 and the second sensor 174). FIG. 2B shows a first transmission pattern 252 corresponding to the transmission pattern of light passing through the first filter 162 and a second transmission pattern 254 corresponding to the transmission pattern of light passing through the second filter 164. As noted above, the difference in the respective thicknesses of the first filter 162 and the second filter 164 may cause light passing through the first filter 162 to form a different transmission pattern than the same light passing through the second filter 164. In particular, the positions of the transmission peaks within the first transmission pattern 162 may differ from the positions of the transmission peaks within the second transmission pattern 164 due to the differences in the thickness of the first filter 162 and the second filter 164.

In some example embodiments, the first transmission pattern 252 may correspond to the wavelengths of light that is able to pass through the first filter 162 while the second transmission pattern 254 may correspond to the wavelengths of light that is able to pass through the second filter 164. Thus, the first transmission pattern 252 and the second transmission pattern 254 may each provide a respective sampling of the original spectrum of the light passing through the first filter 162 and the second filter 164.

It should be appreciated that the transmission pattern of a filter (e.g., etalon) may correlate with the reflectivity of the reflective surfaces as well the thickness of the filter (e.g., the distance between the reflective surfaces). Thus, in some example embodiments, the first filter 162 and the second filter 164 may be configured with different thicknesses such that the first transmission pattern 252 is different from the second transmission pattern 254. The first transmission pattern 252 may be different from the second transmission pattern 254, when at least one transmission peak in the first transmission pattern 252 does not overlap with a transmission peak in the second transmission pattern 254. Alternately and/or additionally, the reflectivity of the surfaces forming the first filter 162 and the second filter 164 may be configured (e.g., to different values) such that the first transmission pattern 252 is different from the second transmission pattern 254.

In some example embodiments, the transmission pattern $T_i$ for a filter i (e.g., in the selectable filter wheel 144 and/or the filter array 154) may be defined by the following equation (1):

$$T_i(\lambda) = \frac{(1-R)^2}{1 + R^2 - 2R\cos\delta} \delta = \left(\frac{2\pi}{\lambda}\right) 2dn \qquad (1)$$

wherein $\lambda$ may be the wavelength of the light incident at a normal angle on the filter (e.g., the first filter 162 and/or the second filter 164), R may be the reflectivity of the reflective surfaces forming the filter, d may be a distance between the reflective surfaces forming the filter, and n may be the refractive index of the optically transparent medium separating the reflective surfaces.

In some example embodiments, a sensor (e.g., first sensor 172, the second sensor 174) may detect, from a filter (e.g., the first filter 162, the second filter 164), a signal that corresponds to the transmission pattern formed by incoming light passing through the filter. The signal $I_i$ for a filter i (e.g., in the filter array 156) may be defined by the following equation (2):

$$I_i = \int T_i(\lambda) S(\lambda) d\lambda \qquad (2)$$

wherein i=1, 2, ... m, m may correspond to a total number of filters (e.g., in the selectable filter wheel 144 and/or the filter array 154), and $S(\lambda)$ may a spectrum of the light incident on the filter i.

In some example embodiments, the signal $I_i$ obtained at the filter i may correspond to the transmission pattern $T_i$ formed by the light passing through the filter i. Thus, the original spectrum S may be recovered based at least on the individual transmission patterns $T_i$ at each filter i. For instance, one or more signal reconstruction techniques may be applied in order to determine a reconstructed spectrum S' that best fits the signals $I_i$ obtained from each of the m number of filters (e.g., in the selectable filter wheel 144 and/or the filter array 154).

When a compressive sensing signal reconstruction technique is applied to reconstruct the original spectrum S, minimization of the L1 norm may converge to a sparse solution for the reconstructed spectrum S'. As such, a compressive sensing signal reconstruction technique may be suitable when the filter array is relatively small (e.g., when m is a relatively small value) and/or the original spectrum S is sufficiently sparse to be reconstructed based on relatively few measurements of the incoming light.

The fidelity of reconstructed spectrum S' (e.g., with respect to the original spectrum S) may be dependent on the number m of the signals $I_i$ and/or the transmission patterns $T_i$ used to generate the reconstructed spectrum S'. Thus, a total number of filters (e.g., etalons) in the selectable filter wheel 144 and/or the filter array 154 may limit the fidelity of the reconstructed spectrum S'. Moreover, this limit on reconstruction fidelity may be further related to the sparsity of the original spectrum S, which may correspond to a number of wavelength components in the original spectrum S that are at or near zero. Accordingly, some signal reconstruction techniques (e.g., compressive sensing) may be especially suitable for recovering a sparse spectrum from a relatively few number of measurements. To further illustrate, the spectrum of a laser is extremely sparse in wavelength, being nearly monochromatic. Thus, the original spectrum of a laser may be accurately reconstructed using compressive sensing and a small number of measurements. By contrast, the spectrum for white noise may be extremely dense, thereby preventing the spectrum for white noise from being reconstructed to a high fidelity using compressing sensing and a small number of measurements.

The number m of filters in the selectable filter wheel 144 and/or the filter array 154 may be determined based on the sparsity of the original spectrum S. For instance, the selectable filter wheel 144 and/or the filter array 154 may include a threshold number of filters (e.g., etalons) required to achieve a required level of reconstruction fidelity. This threshold number of filters may vary depending on the sparsity of the original spectrum S that requires reconstruction. It should be appreciated that the selectable filter wheel 144 and/or the filter array 154 may include a larger number of filters when the original spectrum S is dense. By contrast, the selectable filter wheel 144 and/or the filter array 154 may include a smaller number of filters when the original spectrum S is sparse.

The spectral resolution of the reconstructed spectrum S may correspond to the thickness of the filters (e.g., the first filter 162, the second filter 164) in the selectable filter wheel 144 and/or the filter array 154. Here, the quality factor (Q-factor) of a filter (e.g., etalon) and the sharpness of the transmission peaks (e.g., in a transmission pattern) may be in direct correlation with the thickness of the filter. That is, the sharpness of the transmission peaks (e.g., in a transmission pattern) may correspond to the sharpness of a point-spread function. Thus, a thicker filter (e.g., etalon) may provide transmission peaks having a finer full-width half maximum (FWHM) and a higher resolution reconstructed spectrum. It should be appreciated that some signal reconstruction techniques may be able to compensate for a limit in spectral resolution imposed by the thickness of the available filters. For instance, compressive sensing may enable a highly accurate recovery of a sparse spectrum, despite resolution limits imposed by the available filters.

The filter array spectrometer 110 may be calibrated. For instance, the filter array spectrometer 110 may be calibrated in order to correct for a non-uniform illumination of the filter array 154 (e.g., due to the collimating of the incoming light). Moreover, the filter array spectrometer 110 may be calibrated based on one or more known spectra. A correction factor may be generated based on a difference between the known spectra and the spectra measured by the filter array spectrometer 110. The correction factor may correspond to an average deviation between the known spectra and the spectra measured by the filter array spectrometer 110. This correction factor may be applied to subsequent measurements taken using the filter array spectrometer 110.

Figure 4:
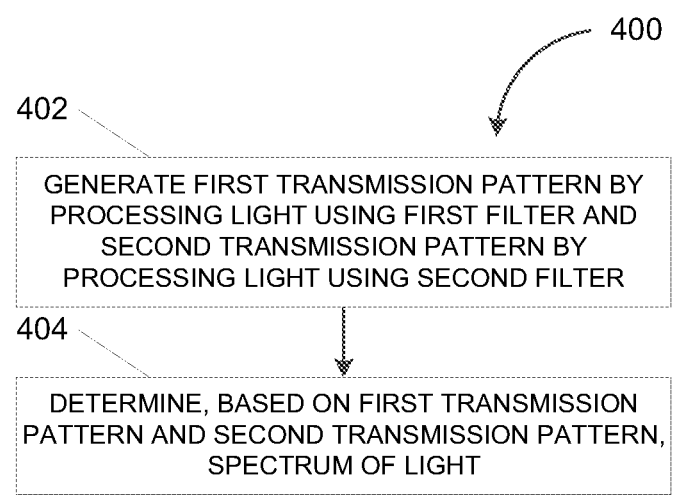
FIG. 4 depicts a flowchart illustrating a process for reconstructive spectrometry, in accordance with some example embodiments.

FIG. 4 depicts a flowchart illustrating a process 400 for reconstructive spectrometry, in accordance with some example embodiments. Referring to FIGS. 1-4, the process 400 may be performed by the reconstructive spectrometry system 100.

The reconstructive spectrometry system 100 may generate the first transmission pattern 252 by at least processing light using the first filter 162 and the second transmission pattern 254 by at least processing the light using the second filter 164 (402). For instance, the reconstructive spectrometry system 100 may include the filter array spectrometer 110. The filter array spectrometer 110 may include the first filter 162 and the second filter 164. Light passing through the first filter 162 may the first transmission pattern 252 while the same light passing through the second filter 164 may generate the second transmission pattern 254. The first transmission pattern 252 and the second transmission pattern 254 may differ in at least the positions of one or more transmission peaks within the first transmission pattern 252 and the second transmission pattern 254. It should be appreciated that the differences between the first transmission pattern 252 and the second transmission pattern 254 may correspond to differences in the respective thicknesses of the first filter 162 and the second filter 164.

The reconstructive spectrometry system 100 may determine, based at least on the first transmission pattern and the second transmission pattern, a spectrum of the incoming light (404). In some example embodiments, the reconstructive spectrometry system 100 (e.g., the spectrum generator 130) may reconstruct the original spectrum of the incoming light based at least on the first transmission pattern 252 and the second transmission pattern 254. For instance, the reconstructive spectrometry system 100 may apply one or more signal reconstruction techniques (e.g., compressive sensing) to at least determine an approximation of the original spectrum that best fits the first transmission pattern 252 and the second transmission pattern 254.

Table 1 below shows pseudo program code implementing the operations of the reconstructive spectrometry system 100. For instance, Table 1 shows pseudo program code for calibrating of the reconstructive spectrometry system 100, the collection of measurements (e.g., transmission patterns) taken at each filter (e.g., in the selectable filter wheel 144 and/or the filter array 154), and for reconstructing the original spectrum S.

TABLE 1

```
// Calibration procedure
get A; // A is a matrix that contains the transmission spectrum for each filter
// Measurement procedure
measure y; // y is a vector of the total amount of light transmitted through each filter
// Spectrum recovery using an iterative solver
set x'; // x' is an initial guess of the spectrum
Do until x' fits observed data:
    calculate reconstruction metric of A*x';
    Use metric to make a new guess of x';
loop
final x' is the recovered spectrum of incident light
```

Figure 5:
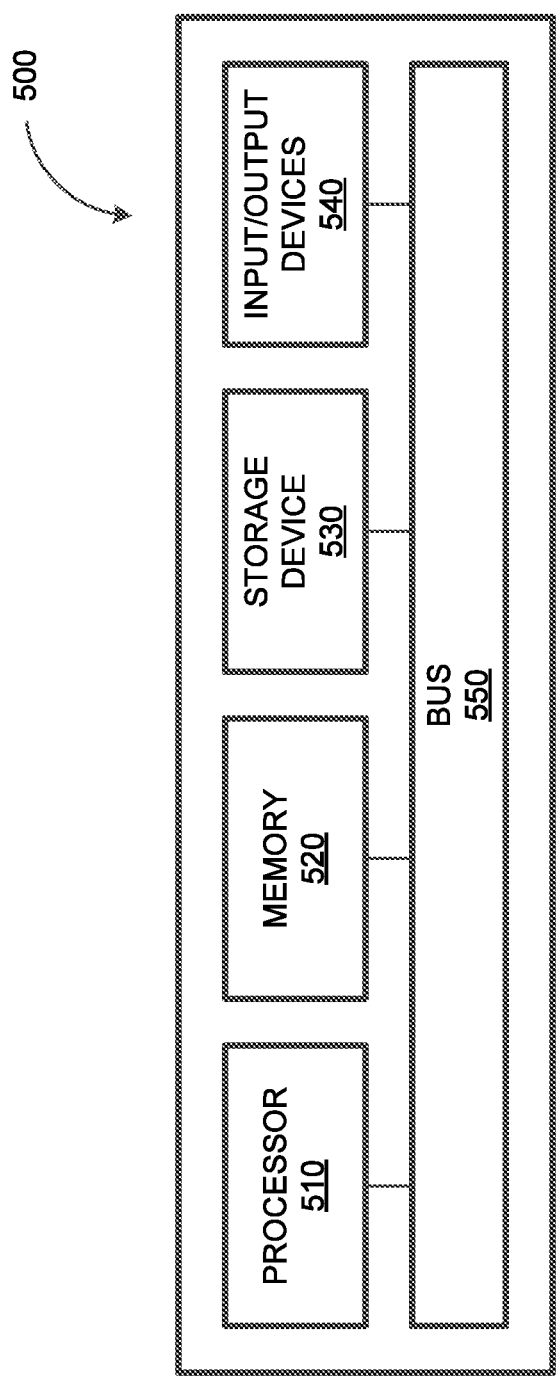
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 1 and 5, the computing system 500 can be used to implement the spectrum generator 130 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the spectrum generator 130. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    an etalon array having a first etalon and a second etalon, the first etalon having a first pair of at least partially reflective surfaces and being configured to process light to at least generate a first transmission pattern, the first transmission pattern having at least a first transmission peak corresponding to a first wavelength in an original spectrum of the light, the second etalon having a second pair of at least partially reflective surfaces, the second pair separate from the first pair, the second etalon being configured to process the light to at least generate a second transmission pattern, the second transmission pattern having at least a second transmission peak corresponding to a second wavelength in the original spectrum of the light, the first etalon having a different thickness than the second etalon in order for the first transmission pattern to have at least one transmission peak that is at a different wavelength than the second transmission pattern, and the first transmission pattern and the second transmission pattern enabling a reconstruction the original spectrum of the light for spectroscopy.
2. The system of claim 1, further comprising:
    at least one data processor; and
    at least one memory including program code which when executed by the at least one data processor provides operations comprising:
        reconstructing, based at least on the first transmission pattern and the second transmission pattern, the original spectrum of the light.
3. The system of claim 2, wherein the reconstructing of the original spectrum of the light comprises applying one or more signal reconstruction techniques.
4. The system of claim 3, wherein the one or more signal reconstruction techniques comprise compressive sensing.
5. The system of claim 3, wherein the one or more signal reconstruction techniques are applied to determine an approximate spectrum of the light that best fits the first transmission pattern and the second transmission pattern.
6. The system of claim 2, further comprising:
    determining a correction factor, the correction factor being determined based at least on a difference between the original spectrum of the light passing through the etalon array and the reconstructed spectrum of the light.
7. The system of claim 6, further comprising:
    applying the correction factor to a light spectrum that is subsequently reconstructed based on transmission patterns generated by the first etalon and/or the second etalon.
8. The system of claim 2, further comprising:
    analyzing, based at least on the reconstructed spectrum of the light, an object emitting, reflecting, and/or transmitting the light.
9. The system of claim 8, wherein the analyzing of the object comprises determining, based at least on the reconstructed spectrum of the light, a molecular composition of the object and/or a temperature of the object.
10. The system of claim 8, wherein the analyzing of the object comprises comparing the reconstructed spectrum of the light to a plurality of known spectra.
11. The system of claim 1, wherein the first etalon is formed from a first pair of reflective surfaces separated by a first distance, and wherein the second etalon is formed from a second pair of reflective surfaces separated by a second distance.
12. The system of claim 11, wherein the first pair of reflective surfaces and/or the second pair of reflective surfaces are formed from a metallic film.
13. The system of claim 11, wherein the first pair of reflective surfaces and/or the second pair of reflective surfaces are separated by an optically transparent medium.
14. The system of claim 11, wherein the first transmission peak is caused at least by constructive interference of the light being reflected by the first pair of reflective surfaces, and wherein the second transmission peak is caused at least by constructive interference of the light being reflected by the second pair of reflective surfaces.
15. The system of claim 1, wherein the etalon array comprises a threshold number of etalons, the threshold number of etalons being determined based at least on a sparsity of the spectrum of the light.
16. The system of claim 1, further comprising:
    a sensor, the etalon array being disposed before the sensor, and the sensor being configured to at least capture the first transmission pattern and/or the second transmission pattern.
17. The system of claim 1, wherein the etalon array comprises a grid structure configured to simultaneously dispose the first etalon and the second etalon before the sensor, and wherein the sensor is configured to simultaneously capture the first transmission pattern and the second transmission pattern.

18. The system of claim 1, wherein the etalon array comprises a selectable wheel configured to dispose the first etalon before the sensor prior to disposing the second etalon before the sensor, and wherein the sensor is configured to capture the first transmission pattern prior to capturing the second transmission pattern.

19. The system of claim 1, wherein a resolution of the reconstructed spectrum corresponds to a respective thickness of the first etalon and the second etalon.

20. A method, comprising:
generating, by a first etalon in an etalon array, a first transmission pattern, the first etalon having a first pair of at least partially reflective surfaces and being configured to generate the first transmission pattern by at least processing light, and the first transmission pattern having at least a first transmission peak corresponding to a first wavelength in an original spectrum of the light; and
generating, by a second etalon in the etalon array, a second transmission pattern, the second etalon having a second pair of at least partially reflective surfaces, the second pair separate from the first pair, the second etalon being configured to generate the second transmission pattern by at least processing the light, the second transmission pattern having at least a second transmission peak corresponding to a second wavelength in the original spectrum of the light, the first etalon having a different thickness than the second etalon in order for the first transmission pattern to have at least one transmission peak that is at a different wavelength than the second transmission pattern, and the first transmission pattern and the second transmission pattern enabling a reconstruction the original spectrum of the light for spectroscopy.

* * * * *